United States Patent
Palicka et al.

(10) Patent No.: US 7,077,306 B2
(45) Date of Patent: Jul. 18, 2006

(54) CERAMIC ARMOR AND METHOD OF MAKING BY ENCAPSULATION IN A HOT PRESSED THREE LAYER METAL ASSEMBLY

(75) Inventors: Richard John Palicka, San Clemente, CA (US); Daniel Ashkin, San Marcos, CA (US)

(73) Assignee: Cercom, Inc., CA (US)

( * ) Notice: Subject to any disclaimer, the term of this patent is extended or adjusted under 35 U.S.C. 154(b) by 0 days.

(21) Appl. No.: 10/721,862

(22) Filed: Nov. 26, 2003

(65) Prior Publication Data

US 2006/0105184 A1    May 18, 2006

(51) Int. Cl.
*F41H 5/04*  (2006.01)
*B23K 20/02* (2006.01)
*B32B 3/14*  (2006.01)

(52) U.S. Cl. ............... 228/170; 228/190; 228/193; 228/219; 428/614; 428/76; 428/627; 89/36.02

(58) Field of Classification Search ............. 428/614, 428/609, 627, 632, 76, 469, 472; 89/36.02; 109/82, 84; 228/170, 161, 175, 120, 190, 228/193, 219; 29/505, 469.5

See application file for complete search history.

(56) References Cited

U.S. PATENT DOCUMENTS

| | | | | |
|---|---|---|---|---|
| 3,616,115 A | * | 10/1971 | Klimmek | ............... 109/84 |
| 3,874,855 A | * | 4/1975 | Legrand | ............... 428/550 |
| 4,099,988 A | * | 7/1978 | Horiuchi et al. | ............ 428/683 |
| 4,760,611 A | * | 8/1988 | Huet et al. | ............... 2/2.5 |
| 5,361,678 A | * | 11/1994 | Roopchand et al. | ........ 89/36.02 |
| H1434 H | * | 5/1995 | Cytron | ............... 89/36.02 |
| 6,635,357 B1 | * | 10/2003 | Moxson et al. | ............. 428/548 |

\* cited by examiner

*Primary Examiner*—John J. Zimmerman
(74) *Attorney, Agent, or Firm*—H. Jay Spiegel

(57) ABSTRACT

A ceramic armor is disclosed in several embodiments. In a first embodiment, a metal base plate has a metal frame assembled on it having a central opening into which the ceramic material is placed. A cover plate is placed over the frame to enclose the ceramic material on all sides. In a second embodiment, the frame has an open central area that has two crossing walls that define four sub-chambers. Four pieces of ceramic material are placed in the respective sub-chambers and a covering plate is placed over it. In a further embodiment, the frame has a plurality of cavities mechanically formed in it. A ceramic tile or plate is placed in each cavity and a cover plate is placed over the frame. The metal used to encapsulate the ceramic material may, if desired, comprise a Titanium alloy such as Ti-6Al-4V, and the ceramic material may comprise Silicon Carbide, Boron Carbide, Tungsten Carbide, Titanium Diboride or Aluminum Nitride. A hot pressing procedure is carried out on the armor to cause the metal to plastically deform about the encapsulated ceramic material.

16 Claims, 5 Drawing Sheets

CERAMIC ARMOR AND METHOD OF MAKING BY ENCAPSULATION IN A HOT PRESSED THREE LAYER METAL ASSEMBLY

BACKGROUND OF THE INVENTION

The present invention relates to ceramic armor and the method of making it by encapsulation in a hot pressed three layer metal assembly. Ceramic containing armor has been shown to be an effective means to protect against a wide variety of ballistic threats because of its combination of high hardness, strength and stiffness along with low bulk density and favorable pulverization characteristics upon impact.

However, ceramic material alone has been found to be ineffective against heavy ballistic threats such as Tungsten Carbide projectiles, and long rod heavy metal penetrators. Long rod projectiles can have a significant ratio of length to diameter, up to 40, and can travel at velocities up to or exceeding 1 mile per second. For the ceramic to effectively stop such threats, the ceramic material must be supported or encapsulated with another material such as metal or another composite capable of absorbing energy and providing stiffness support for the ceramic.

However, merely mechanically assembling an armor consisting of ceramic material encapsulated by metal, without further processing, fails to optimize the ballistic performance of armor. As such, a need has developed for an encapsulated ceramic armor material that optimizes ballistic performance and may be manufactured in a repeatable, predictable way. It is with this thought in mind that the present invention was developed.

SUMMARY OF THE INVENTION

The present invention relates to a ceramic armor and the method of making it by encapsulation in a hot pressed three layer metal assembly. The present invention includes the following interrelated objects, aspects and features:

(1) The inventive armor is disclosed in several structural embodiments which are considered to be exemplary of the teachings of the present invention. In a first such embodiment, a metal base plate has a metal frame placed thereon having a central opening into which the ceramic material is placed. A cover plate is placed over the frame to enclose the ceramic material on all sides.

(2) In a second embodiment of the present invention, a metal base plate is covered by a frame having an open central area that has two crossing walls therein to define four sub-chambers. Four pieces of ceramic material are placed in the respective sub-chambers and a covering plate is placed thereover.

(3) In a further embodiment, a flat base plate is covered by a second plate in which a plurality of cavities have been mechanically formed. A ceramic tile is placed in each cavity and a cover plate is placed thereover.

(4) Concerning each of the embodiments described above, the metal used to encapsulate the ceramic material may, if desired, comprise a Titanium alloy such as Ti-6Al-4V. This material is particularly effective as a ballistic material because it has a relatively low density (4.5 g/cc), relatively high strength (900 MPa) and good ductility (yield strength of 830 MPa at 0.2% yield). Thermal expansion of Ti-6Al-4V is approximately $10.5 \times 10^{-6}$ in/in° C. from 0–600° C. This coefficient of thermal expansion is considerably higher than that of dense SiC which is a common ceramic employed for armor applications. The thermal expansion of SiC is $4.1 \times 10^{-6}$ in/in° C. from 0–600° C. The SiC material described above as comprising the ceramic material may comprise, for example, PAD SiC-N ceramics.

(5) In each of the physical embodiments of armor in accordance with the teachings of the present invention, once the armor is assembled with the ceramic material encapsulated within the metallic material, the entire armor is heated to a temperature sufficiently high enough to cause the metal to be plastically deformed around the ceramic. In order for this to succeed, the ceramic material must have dimensions so that it is as close as possible to the dimensions of the chamber in which the ceramic material is placed. The ceramic material must be strongly confined on all sides during thermal cycling so that, during the heating and cooling process, the ceramic is placed into compression. The degree of compression to which the ceramic material is exposed is a function of the thermal expansion mismatch between the metal and the ceramic, the change in temperature during the processing, the yield properties of the metal, the applied pressure, and the dimensions of the device itself.

As such, it is a first object of the present invention to provide ceramic armor and a method of making it by encapsulation in a hot pressed three layer metal assembly.

It is a further object of the present invention to provide such an armor in various embodiments thereof including those in which a single piece of ceramic is encapsulated within a single cavity.

It is a still further object of the present invention to provide such a device in which a plurality of discrete ceramic pieces are each encapsulated within a sub-chamber within a metal portion.

It is a still further object of the present invention to provide such a device in which the chambers that receive the ceramic material are formed through assembly of separate parts in situ.

It is a yet further object of the present invention to provide such a device in which the sub-chambers receiving the ceramic pieces are formed through an EDM or conventionally milled process that mechanically forms the sub-chambers or cavities.

It is a still further object of the present invention to provide a method of creating ceramic armor in which the ceramic material encapsulated with the metal material are subjected to a hot pressing process to cause the metal to be plastically deformed around the ceramic.

These and other objects, aspects and features of the present invention will be better understood from the following detailed description of the preferred embodiments when read in conjunction with the appended drawing figures.

SPECIFIC DESCRIPTION OF THE PREFERRED EMBODIMENTS

Figure 1:
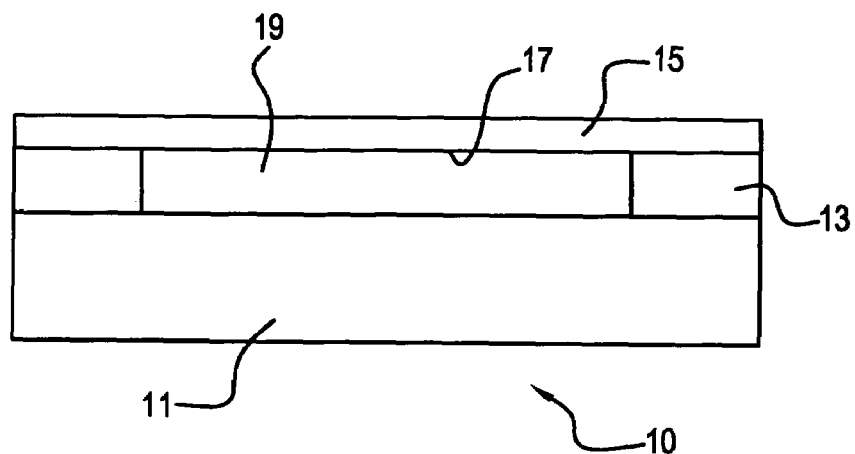
FIG. 1 shows a schematic cross-sectional representation of a three layer construction encapsulating a ceramic plate in accordance with the teachings of the present invention.
Figure 2:
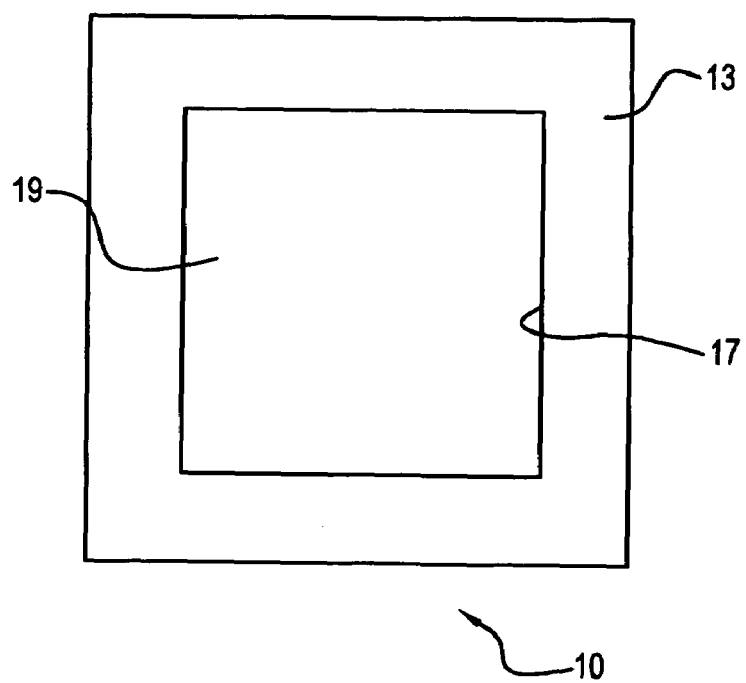
FIG. 2 shows a top view of the construction of FIG. 1.

Reference is first made to FIGS. 1 and 2 which show a schematic representation of a three layer construction in accordance with the teachings of the present invention. The inventive construction is generally designated by the reference numeral 10 and is seen to include a base plate 11, a metal frame 13, and a cover plate 15, which combine to define an internal chamber 17. Within the chamber 17, a ceramic plate or tile 19 is encapsulated.

As shown in FIG. 2, the frame 13 may be generally rectangular, having the internal chamber 17 sized to closely receive the ceramic plate or tile 19 therein.

Figure 3:
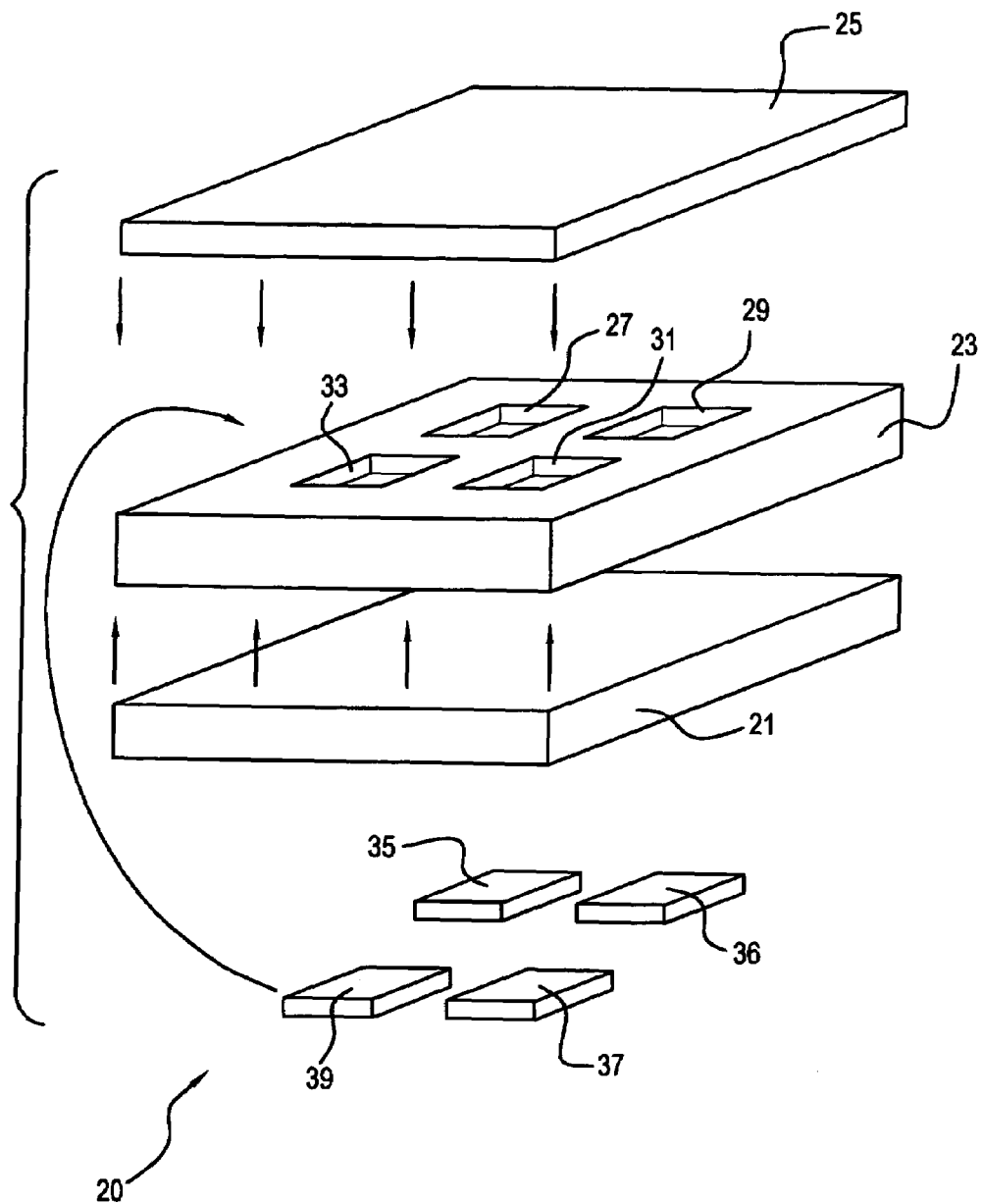
FIG. 3 shows an exploded perspective view of a second embodiment of the present invention.

With reference to FIG. 3, a second embodiment of the present invention is generally designated by the reference numeral 20 and is seen to include a base plate 21, a middle plate 23, and a cover plate 25. The middle plate 23 has a plurality of cavities 27, 29, 31 and 33 formed therein through any desired manner including electrical discharge machining EDM processing or mechanical processing.

Ceramic tiles 35, 36, 37 and 39 are respectively received within the cavities 27, 29, 31 and 33, whereupon the cover plate 25 is placed thereover to encapsulate the ceramic tiles.

Figure 4:
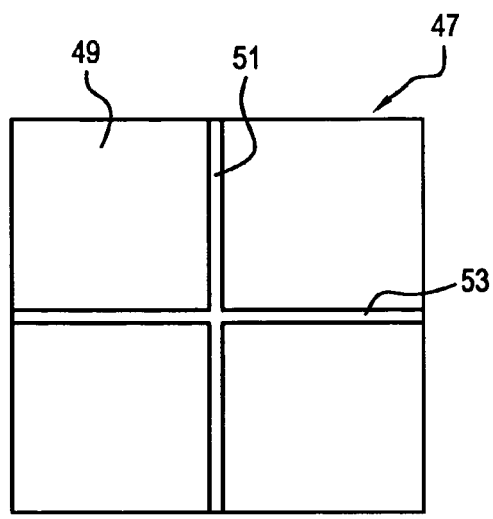
FIG. 4 shows a top view of a base plate of a third embodiment of the present invention.
Figure 5:
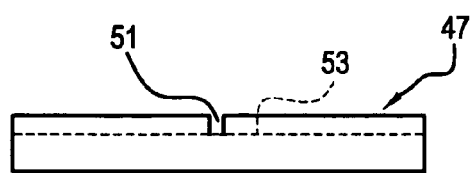
FIG. 5 shows a side view of the base plate of FIG. 4.
Figure 8:
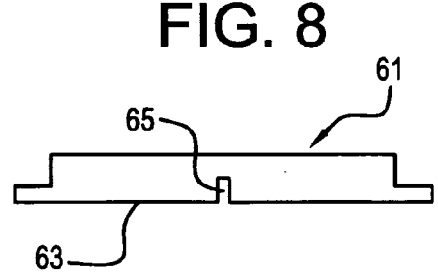
FIG. 8 shows a side view of a further cross beam to be assembled to the base plate of FIGS. 4–5.
Figure 9:
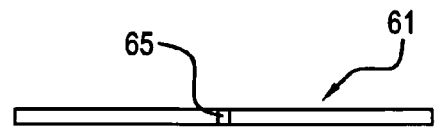
FIG. 9 shows a top view of the cross beam of FIG. 8.
Figure 10:
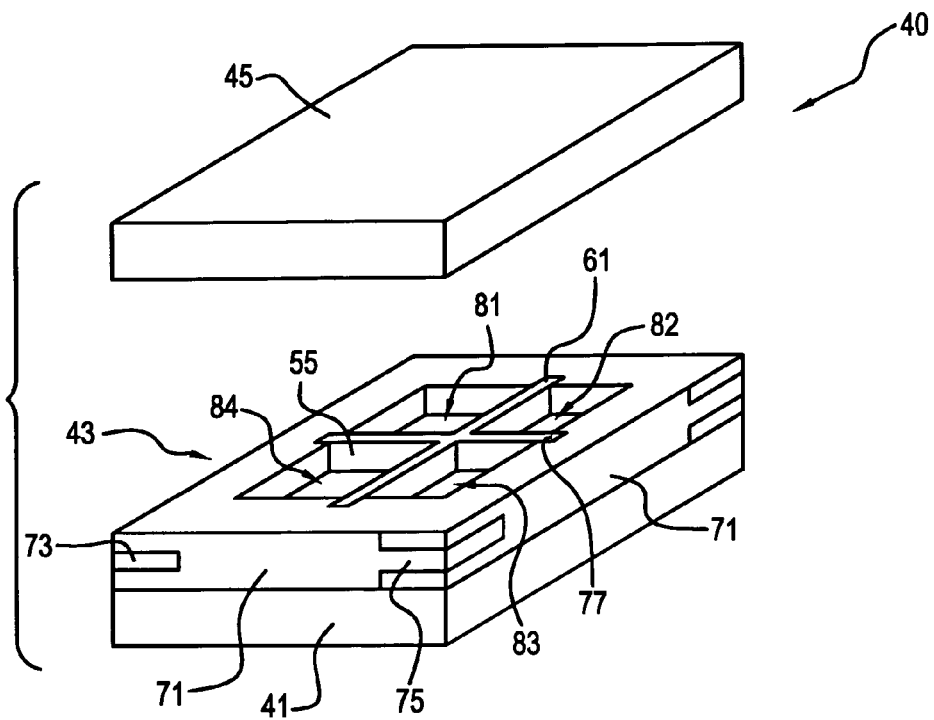
FIG. 10 shows a perspective view of the parts illustrated in FIGS. 4–9 as assembled together.

With reference, now, to FIGS. 4–10, a further embodiment of the present invention is generally designated by the reference numeral 40 (see FIG. 10). The embodiment 40 includes a base plate 41, a frame structure 43, and a cover plate 45. With reference to FIGS. 4–9, the manner of assembly of the frame 43 will be explained. With reference, first, to FIGS. 4 and 5, the frame 43 includes a base plate 47 having a top surface 49 into which crossing grooves 51 and 53 are formed, of which the groove 51 is also seen in full lines in FIG. 5, and the groove 53 is shown in phantom therein.

Figure 6:
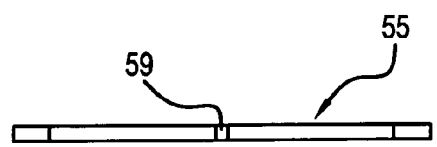
FIG. 6 shows a side view of a first cross beam to be assembled to the base plate of FIGS. 4–5.
Figure 7:
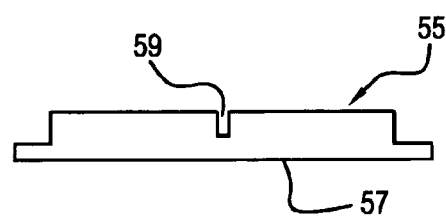
FIG. 7 shows a side view of the cross beam of FIG. 6.

With reference to FIGS. 6 and 7, a cross beam 55 has a bottom surface 57 inserted into the groove 51 and also includes an upper slot 59. With reference to FIGS. 8–9, a further cross beam 61 includes a bottom surface 63 designed to rest within the groove 53 and a slot 65 that is placed over the slot 59 in the beam 55 when assembled.

With reference to FIG. 10, the frame 43 is made up of four legs 71, each of which has a rear slot 73 and a forward protrusion 75 to form "tongue and groove" connections with adjacent legs 71. Each of the legs has a vertical slot 77 therein which is designed to receive one of the ends of either one of the cross beams 55 or 61. As assembled, the frame 43 defines four cavities 81, 82, 83 and 84. As before, each of these cavities closely receives a ceramic plate or tile, whereupon the cover plate 45 is placed thereover.

Figure 11:
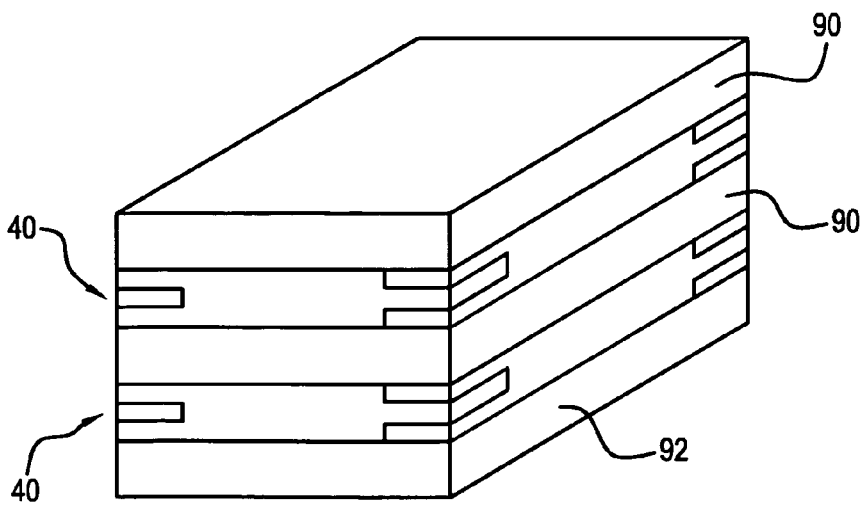
FIG. 11 shows a perspective view of a plurality of constructions of the embodiment of FIGS. 4–10 assembled together in vertically spaced layers.

FIG. 11 shows a ceramic armor made up of a plurality of armor constructions 40 stacked vertically with cover plates 90 and a base plate 92 shown.

In each of the embodiments of the present invention, it is preferred that the ceramic plate or tile or plates or tiles is/are machined to be within 0.005 inches of the corresponding dimensions of the sub-chambers or cells within which they are placed. In accordance with the teachings of the present invention, it is preferred that the metal material used to encapsulate the ceramic material consists of a material having relatively low density, high strength and good ductility along with a coefficient of thermal expansion higher than the coefficient of expansion for the ceramic material encapsulated therewithin. Applicants have found that an alloy of Titanium known as Ti-6Al-4V or Ti-6Al-4V ELI (Extra Low Interstitials) is a suitable material for this purpose. Ti-6Al-4V has a relatively low density (4.5 g/cc), relatively high strength (900 MPa), and good ductility (yield strength of 830 MPa at 0.2% yield), and can be bought already annealed according to Mil T 9046 spec. The thermal expansion of Ti-6Al-4V is about $10.5 \times 10^{-6}$ in/in° C. from 0–600° C., a coefficient considerably higher than that of dense SiC which has a thermal expansion coefficient of $4.1 \times 10^{-6}$ in/in° C. from 0–600° C., a difference in which the thermal expansion coefficient for the Titanium alloy is over 2% times the thermal expansion coefficient for the ceramic material.

In the preferred embodiment of the present invention, the ceramic material employed may consist of PAD SiC-N, one of a family of Cercom's dense hot pressed ceramics. Other grades and types of armor ceramics such as Silicon Carbide, Boron Carbide, Tungsten Carbide, Titanium Diboride, Aluminum Oxide, Silicon Nitride and Aluminum Nitride or mixtures of the aforementioned materials can be employed. Such armor ceramics have thermal coefficients of expansion from about $3.0 \times 10^{-6}$ to about $9 \times 10^{-6}$ in/in° C. and hardness greater than 1100 kg/mm$^2$.

In practicing the method of hot pressing the ceramic armor in accordance with any of the embodiments of the present invention, after the ceramic material is completely encapsulated within the metal material, the hot pressing operation commences by placing the assembly within a furnace contained within a chamber in which pressure can be controlled by a mechanical or hydraulic press. The temperature is then increased sufficiently such that the metal encapsulating the ceramic is plastically deformed around the ceramic while contained within a die of refractory material. The degree of compression of the ceramic that is produced during hot pressing is a function of the thermal expansion mismatch between the metal and ceramic, the rate of temperature decrease during processing, the yield properties of the metal, and the dimensions of the components.

Concerning each of the embodiments of the ceramic armor described in detail hereinabove, the method of encapsulating the ceramic material within the Titanium alloy is the same. The process steps are as follows:

(1) First, all surfaces of the Titanium alloy must be degreased and cleaned. Degreasing can be done by steam cleaning, alkaline cleaning, vapor degreasing or solvent cleaning. Where the surfaces are diamond machined and have a light oxide film, mechanical cleaning by an abrasive pad such as that which is known by the Trademark "SCOTCH BRITE," abrasive sand blasting, wire brushing or draw filing is sufficient. Where the surfaces have been machined, as is the case in the embodiment of FIG. 3, and have a heavier oxide film, the alloy surfaces that have been so machined should be cleaned by a combination of degreasing, molten salt descaling, acid pickling, and abrasive grinding or polishing. In the preferred process, acid cleaning should be carried out with a mixture of 1–2% HF and 15–40% nitric acid for 1 to 5 minutes at room temperature. The ratio of nitric acid to hydrofluoric acid (HF) should be at least 15.

(2) The ceramic tiles or plates should be degreased using suitable degreasing agents such as, for example, isopropanol followed by acetone. If metal marks exist, an acid cleaning should be performed.

(3) A refractory graphite die is prepared with the walls of the die and spacers thereof first coated with a graphite foil. The graphite foil is provided to ensure a tight fitting die. Examples of suitable thickness for the graphite foil are 0.010 to 0.040" depending upon the actual die and the piece being hot pressed. The walls and surfaces of the spacers are then coated with a Titanium foil having a suitable thickness. One example of a suitable thickness for the Titanium foil is 0.008", although other thicknesses can be equally effective.

(4) The material is then loaded into the die with the bottom of the die cavity having at least 1–2 graphite spacers. Depending upon the complexity of the part, the order in which the part is loaded into the die can vary. Where the ceramic armor consists of a single piece of ceramic encapsulated by a Titanium alloy, the base plate is loaded first followed by the ceramic and then the other structures of the Titanium alloy frame. For complex ceramic armor such as those illustrated in FIGS. 3–11, the entire ceramic armor structure is loaded into the die together with the Titanium alloy cover plate put on top of the frame containing the ceramic plates or tiles. A graphite spacer is then placed on top of the entire assembly. Where multiple assemblies will be placed into the die simultaneously, graphite spacers are placed between each separate assembly.

(5) The die with the assembly or assemblies therein is then loaded into a vacuum hot press. The vacuum hot press consists of a furnace in which the die may be received, with the furnace contained within a sealed chamber in which the internal pressure may be adjusted and inert gas such as Argon may be supplied and exhausted. The atmosphere within the hot press is then preferably lowered to an atmosphere of less than 1.5 torr. Of course, as known to those skilled in the art, higher atmospheric pressures may also be effectively employed if sufficient oxygen gettering material is used in the furnace.

Figure 13:
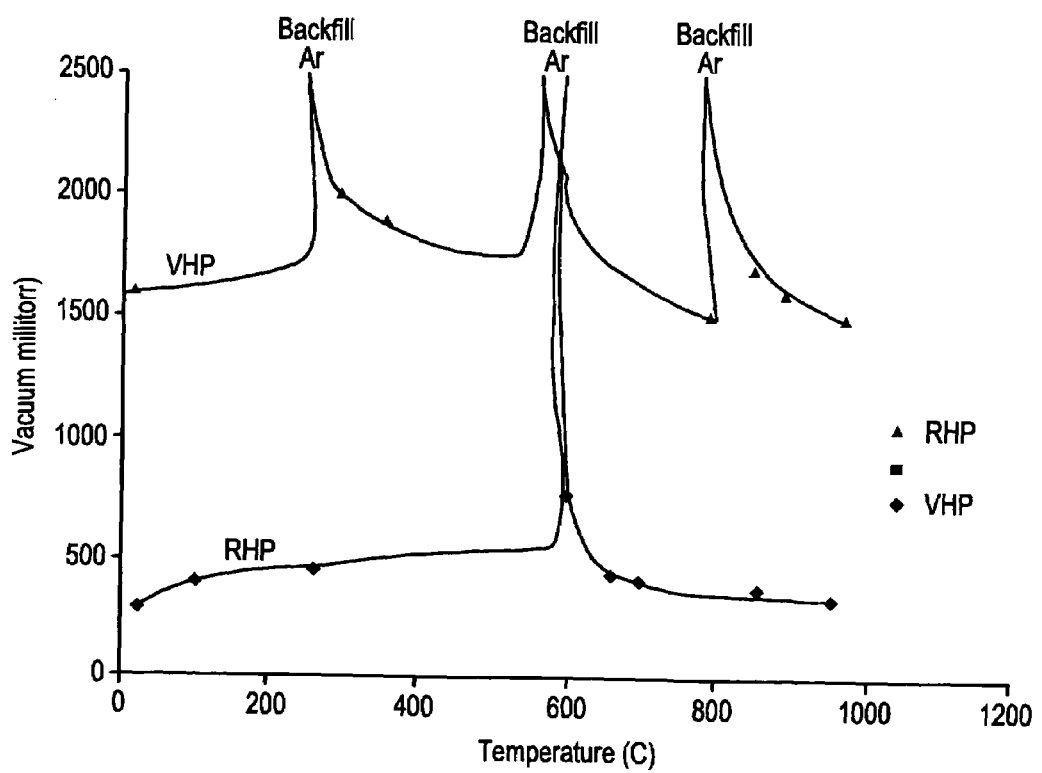
FIG. 13 shows a graph of a portion of the hot pressing process during the portion thereof when temperature is being increased and showing several backfilling and evacuating steps.

(6) Once the required vacuum atmosphere has been achieved, the chamber is heated up to a temperature of about 800° C. and, depending on vacuum level, several optional purging and evacuation cycles may be undertaken (FIG. 13) in which the chamber is first purged with Argon and then evacuated. These cycles are not essential to the process. Once the temperature reaches 800° C., the purging and evacuation steps, if they were employed, are no longer undertaken and the atmosphere is maintained at a level of less than 1.5 torr. Alternatively, the process at and above 800° C. may be undertaken in an inert atmosphere such as high purity Argon.

(7) As the temperature continues to increase, once it reaches a temperature in which the metal can easily diffuse, the physical pressure applied to the armor assembly is increased and bonding is begun. For metals, the temperature at which diffusion usually occurs at rates sufficient for diffusion bonding is equal to, or greater than, one-half the melting temperature of the material. For Titanium and its alloys, the melting temperature is between 1575 and 1725° C. For Ti-6Al-4V, the melting temperature is 1650° C. and, therefore, the minimum temperature for hot pressing this alloy is 825° C. After achieving this temperature, the temperature is increased to its final temperature of 900 to 1300° C., and the necessary physical pressure is applied. Of course, the necessary physical pressure is a function of temperature and may fall within the range of 250 psi to 5000 psi. With increased pressures and temperature, significant plastic deformation of the Titanium alloy occurs accompanied by increased diffusion rates. The bond formed between the Titanium pieces is a diffusion bond and artifacts of the bond are seen to cross individual grains at temperatures between 900 and 1000° C. and hold times of 2.5 hours. For temperatures greater than 1000° C., artifacts of the bond are not visible by microscopic analysis. Applicants have found that one may conclude that diffusion and grain growth have occurred in the material and that the bond is a "diffusion" bond. The significant plastic deformation that occurs at this temperature and pressure aids in grain-to-grain contact. The 900° C. temperature and increased pressure are held for up to 2½ hours. For larger sized ceramic armor pieces, the hold times are increased along with reduction in heating rates. For lower temperature bonding, additives or coatings can be added to the Titanium surfaces to increase the local diffusion rate across the interface.

Figure 12:
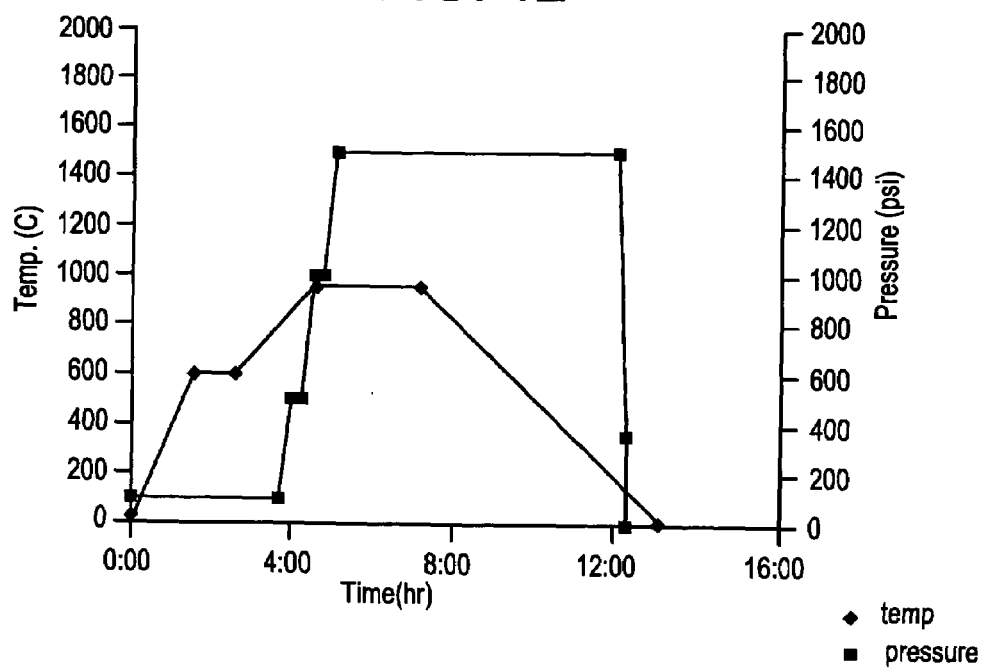
FIG. 12 shows a graph of temperature and pressure versus time for the conducting of the hot pressing process for encapsulating the metal alloy and ceramic material together.

FIG. 12 shows a graph of temperature and pressure versus time for the process as practiced in accordance with the teachings of the present invention.

As such, an invention has been disclosed in terms of preferred embodiments thereof that fulfill each and every one of the objects of the invention as set forth hereinabove, and provide a new and useful ceramic armor and method of making by encapsulation in a hot pressed three layer metal assembly of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

The invention claimed is:

1. A method of making ceramic armor, comprising:
   (a) providing a base plate, a frame having an open center, and a cover plate, together defining an internal chamber;
   (b) inserting a piece of ceramic material into said chamber, said ceramic material being closely received within said chamber, said base plate, frame, cover plate, and ceramic material together defining an assembly;
   (c) said metallic material having a coefficient of thermal expansion greater than a coefficient of thermal expansion of said ceramic material;
   (d) placing said assembly into a graphite die, said die having inner walls coated with Titanium foil, said assembly having outer surfaces engaging said foil, said foil separating said outer surfaces from said walls of said die;
   (e) placing said die with said assembly therein into a hot press consisting of a furnace located within a sealed chamber;
   (f) conducting a hot pressing procedure on said assembly under controlled parameters of temperature, pressure and atmosphere until said metallic material is plastically deformed around said ceramic material.

2. The method of claim 1, wherein said metallic material comprises a Titanium alloy.

3. The method of claim 2, wherein said Titanium alloy comprises Ti-6Al-4V or Ti-6Al-4V ELI.

4. The method of claim 3, wherein said ceramic material comprises a dense SiC ceramic material such as PAD SiC-N.

5. The method of claim 4, wherein the coefficient of thermal expansion of the Titanium alloy is about $10.5 \times 10^{-6}$ in/in° C. from 0–600° C., and the coefficient of thermal expansion of the ceramic material is about $4.1\times10^{-6}$ in/in ° C. from 0–600° C.

6. The method of claim 1, wherein said hot pressing procedure includes the following steps:
 (a) evacuating said sealed chamber to a pressure of about 10 torr;
 (b) heating said sealed chamber to about 800° C. and, during said heating step, purging said sealed chamber with an inert gas at least once followed by evacuating said sealed chamber back to 1 to 1.5 torr;
 (c) maintaining pressure in said sealed chamber to less than 1.5 torr once temperature therein has risen to 800° C.;
 (d) increasing said temperature from 900° C.–1300° C.

7. The method of claim 6, wherein once said temperature reaches 900° C., increasing physical pressure on said assembly in said chamber to at least 250 psi and holding temperature and physical pressure constant for at least two hours.

8. The method of claim 1, wherein said internal chamber of said assembly includes four sub-chambers.

9. The method of claim 8, wherein said sub-chambers are created by machining said frame using an EDM process.

10. The method of claim 1, wherein said coefficient of thermal expansion of said ceramic material is no greater than $9\times10^{-6}$ in/in ° C.

11. The method of claim 10, wherein said ceramic material is chosen from the group consisting of Silicon Carbide, Boron Carbide, Tungsten Carbide, Titanium Diboride, Aluminum Oxide, Silicon Nitride, and Aluminum Nitride.

12. The method of claim 1, wherein said atmosphere comprises a high purity Argon atmosphere.

13. The method of claim 1, wherein graphite foil is placed between said walls of said die and said Titanium foil.

14. The method of claim 1, further including the step of providing graphite spacers between said walls of said die and said assembly.

15. The method of claim 14, further including the step of coating outer surfaces of said spacers with graphite foil.

16. The method of claim 15, further including the step of covering said graphite foil on said spacers with Titanium foil.

* * * * *